Oct. 19, 1926.  
H. H. MILLER  
LIQUID TREATING APPARATUS  
Filed Oct. 26, 1922     2 Sheets-Sheet 2

1,603,970

INVENTOR:  
HARVEY H. MILLER.  
BY  
ATTORNEY.

Patented Oct. 19, 1926.

1,603,970

UNITED STATES PATENT OFFICE.

HARVEY H. MILLER, OF CANTON, OHIO, ASSIGNOR TO THE H. H. MILLER INDUSTRIES COMPANY, OF CANTON, OHIO, A CORPORATION OF OHIO.

LIQUID-TREATING APPARATUS.

Application filed October 26, 1922. Serial No. 597,222.

This invention relates to apparatus for holding or treating liquids, such as milk and other materials.

One object of the invention is to provide an improved apparatus of this character of relatively simple construction capable of ready and economical manufacture.

Another object of the invention is to provide an improved apparatus of this character in which the milk may be heated or cooled or otherwise treated in an easy ready manner, or stored for a relatively long time without affecting its quality or condition for use.

A further object of the invention is to provide an improved apparatus of this character in which the temperature medium circulating means and the flow imparting means are correlated to effect a substantially uniform treatment of the material in the vat or tank without affecting its physical or chemical condition, whereby the milk may be properly treated or stored.

Other objects of the invention will be apparent to those skilled in the art to which my invention relates from the following description taken in connection with the accompanying drawings, wherein Fig. 1 is a view partly in side elevation and partly in section of an apparatus embodying my invention.

Figure 1:
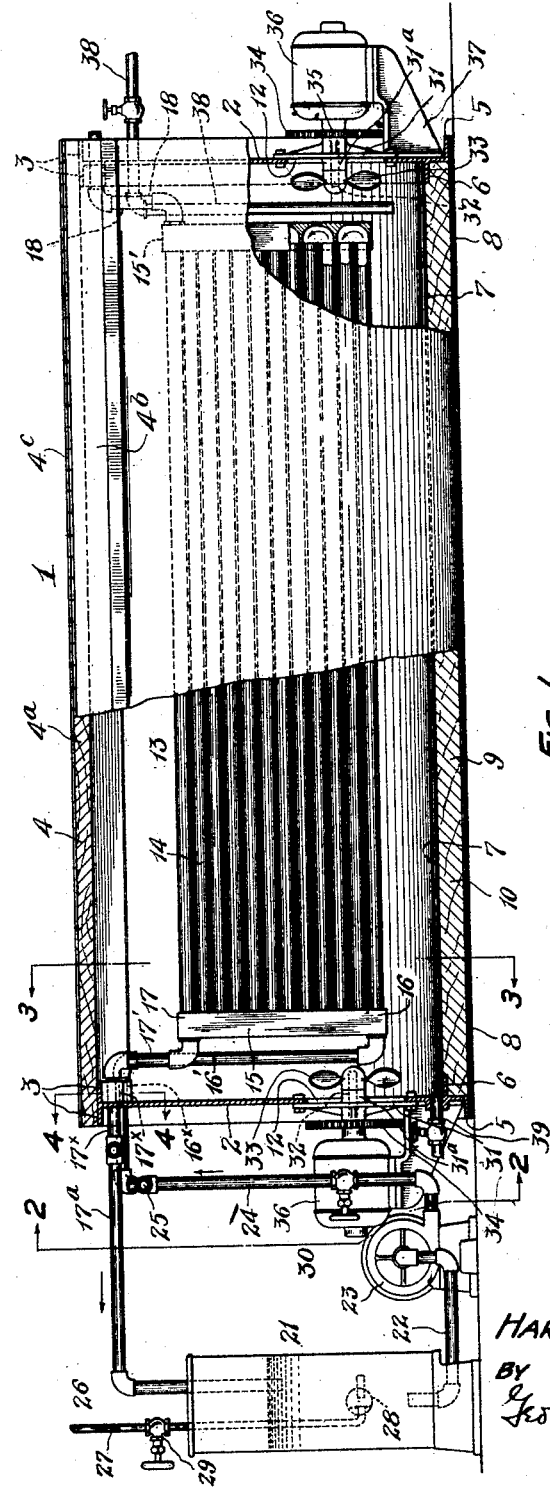

In the drawings, 1 indicates, as an entirety, a vat, holder or tank, which may be of any preferred shape and size and of any desired construction. By preference, the vat is elongated and has a rounded bottom, the latter being extended upwardly to form the sides of the vat to avoid the formation of corners, whereby the interior of the vat may be readily cleaned and sanitary conditions insured. The vat may comprise end walls 2 corresponding in shape to the cross sectional shape of the vat. The end walls 2 may be cast or otherwise formed. Along its upper edge, each wall 2 is provided with inwardly and outwardly extending flanges 3 which together with the flanges 3 on the opposite end wall 2, form a suitable supporting and resting surface for the cover 4. Around its bottom and side edges, each wall 2 is provided with an outwardly extending flange 5 and an inwardly extending flange 6, the latter being spaced from but arranged parallel to the flange 5. By this arrangement suitable provision is made for securing (1) to the flange 6 a liner or inner wall 7 formed from German silver or other material which will not be affected by the milk or other liquids to be treated in the vat and (2) to the flange 5 an exterior wall 8 preferably of sheet metal, to provide between it and the wall 7 a space 9 which may be left to constitute a dead air space or filled with a suitable non-heat conducting material. In the illustrated construction, the space 9 is filled with staves or sections of wood 10, these being utilized to strengthen the vat from end to end as well as to form a suitable back for the walls 7 and 8. By extending the flange 6 outwardly, it will be seen that the staves may be readily positioned against the outer faces to the flanges 5. 11 indicates pairs of feet or standards for supporting the vat, only one pair being shown. Centrally and near its lower edge each end wall 2 is formed with an opening 12, to which reference will later be made. The cover 4 may comprise a central section 4ª secured to the flanges 3 in any desired manner, and movable sections 4ᵇ, 4ᵇ, preferably hinged at 4ᶜ to the opposite longitudinal edges of the section 4ª.

Figure 2:
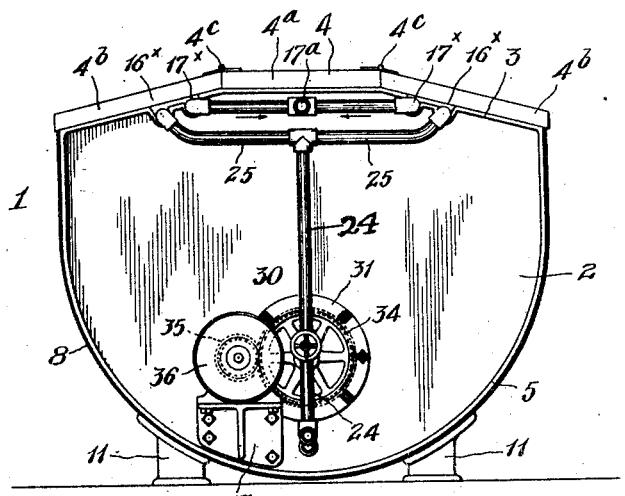
Fig. 2 is a section on the line 2—2 of Fig. 1.
Figure 4:
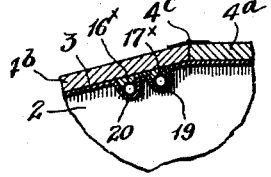
Fig. 4 is a section on the line 4—4 of Fig. 1.
Figure 3:
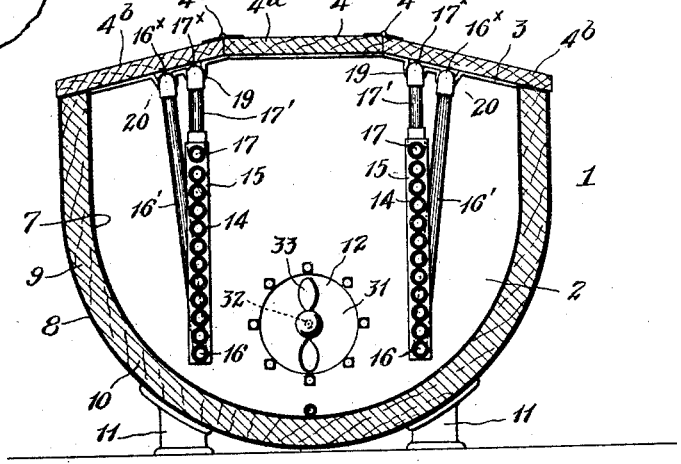
Fig. 3 is a section on the line 3—3 of Fig. 1.

13 indicates as an entirety means for circulating a temperature changing medium to, through, and from the vat, whereby the material, such as milk, therein may be treated. The temperature changing medium may be steam, hot or cold water, brine or other fluids capable of effecting changes in the temperature of the milk or liquids to be treated. In the drawings, I have for illustrative purposes shown the apparatus as arranged and constructed for circulating hot or cold water as the preferred form of construction. Of the medium circulating means, 14 indicates series or sets of pipes, those in each series being in superposed relationship and connected at their opposite ends by manifolds 15, 15′, to form a continuous conduit, the arrangement preferably being such that the inlet 16 and outlet 17 are connected to the same manifold, 15, but at opposite ends thereof, whereby the supply pipe 16' and the discharge pipe 17' may be conveniently arranged at one end of the vat 1. As will be understood from Fig. 3, the series or sets of medium circulating pipes 14 (1) extend longitudinally of the vat 1—substantially from end to end thereof—and are spaced from each other, each substantially midway between a vertical plane cutting the longitudinal axis of the vat and the adjacent side wall and (2) are spaced from the bottom and top of the vat to avoid obstructing the flow of the milk around the vat and structural features which would prevent thorough cleaning of the apparatus. For this purpose I utilize the inlet and outlet pipes 16', 17', of each pipe series 14 at one end thereof and at its other end a bracket member 18, comprising a plurality of pipe sections corresponding to the outlet pipe 17', this construction being relatively simple and permitting uniformity of construction of the end walls 2 without making provision for special supporting devices at that end remote from the manifold to which the inlet and outlet pipes are connected. At 19, 20, the end walls 2 are suitably recessed to receive the laterally extending sections 16ˣ, 17ˣ, of the inlet and outlet pipes 16', 17', respectively, this arrangement permitting the cover sections 4ᵇ to be closed tightly upon the flanges 3. As will be understood from Figs. 2 and 3, the recesses 20 for the inlet pipe sections 16ˣ are disposed at one side of the recesses 19 for the pipe sections 17ˣ and that the inlet pipes 16' extend from the lower ends of the manifolds 15 to the recesses 20 at an angle to the outlet pipes 17'. This arrangement is provided so that the inlet pipes 16' may be utilized to brace the lower ends of the pipe series 14 and thereby prevent swinging movements thereof in either direction. 21 indicates a water holding tank adapted to supply water to the pipe series 14 and to receive the water therefrom. The discharge pipe sections 17ˣ are connected to the pipe 17ᵃ which leads to and discharges the water from its outer end into the tank 21, as shown in Fig. 1. 22 indicates a pipe leading from the lower portion of the holder 21 to a suitable pump 23, the latter preferably being of the centrifugal type. 24 indicates a pipe connected to the discharge end or conduit of the pump 23, and having branches 25 connected respectively with the inlet pipes 16ˣ. By this arrangement it will be seen that the pump takes water from the tank 21 and pumps it through the pipes 16ˣ and 16', the inlets 16 and pipe series 14 and from the latter the water flows back through the discharge pipes 17', 17ˣ, to the tank 21.

26 indicates means for maintaining the water in the tank 21 at the desired temperature. Where the water is to be heated, I prefer to heat it by steam. In carrying out this form of construction, I extend into the tank 21 a steam pipe 27 and provide near its end an injector 28, which operates to agitate the water and effect an intermingling of the steam with the water so that the latter will become heated throughout its entire body in a well known manner. The pipe 27 may be controlled by a suitable valve 29.

30 indicates as an entirety the mechanism for causing the flow of the milk in or around the vat 1, whereby it may be treated or maintained in proper condition while it is being stored. In storing or treating milk it is undesirable to agitate the milk, but it is necessary to keep it moving about in the vat in a relatively slow and steady manner to avoid minor changes in its physical or chemical condition. For this purpose I provide the flow imparting mechanism 30, preferably one such mechanism at each end of the vat 1. Referring to one of these mechanisms, 31 indicates a web or plate closing the opening 12 and secured in a liquid tight manner to the adjacent wall 2. The web 31 is provided with a central opening and hollow bosses 31ᵃ around the opening to form a bearing for a shaft 32. At its inner end, the shaft 32 is provided with a screw or propeller 33; at its outer end the shaft 32 is provided with a gear 34 which meshes with a pinion 35. The pinion 35 is fixed to the shaft of a motor 36—preferably an electric motor—which may be supported upon a bracket 37. The bracket 37 may be screwed to the adjacent end wall 2. The gears 34 and 35 serve as a reduction gearing between the motor 36 and the driven shaft 32, but this form of gearing may be otherwise constructed, if desired. The axis of the screw or propeller 33 is preferably arranged in a vertical plane cutting the longitudinal axis of the vat 1 so that it is arranged substantially midway between the pipe series 14 and serves to cause a flow of the milk therebetween, drawing in the milk from or around the outer sides of the pipe series 14 to replace that caused to flow longitudinally of the vat 1 between the pipe series 14, thereby providing a relatively slow movement throughout the entire body of the milk in the vat. I prefer to provide two flow imparting mechanisms 30 so that one will cause the milk to flow in a direction opposite to the flow caused by the other mechanism, this arrangement insuring a more uniform mixture of the milk without increasing its rate of flow in or around the vat.

In my construction, the pipe series 14 are arranged at either side of the longitudinal axis of the vat to provide an unobstructed space for the milk to flow through under the influence of the flow imparting mechanism or mechanisms and are spaced from the side walls of the vat so that the milk may flow back around their outer sides to replace that forced through the central portion of the vat by the mechanism 30. As the pipes of each pipe series 14 are spaced from each other and the series are spaced from the bottom and top of the vat 1 it will be seen that the milk which is caused to flow longitudinally of the vat may intermingle or mix with the adjacent portions of the milk as well as flow around in the vat and impart to adjacent portions a current or flow so that after the mechanisms 30 are started the entire body of milk has imparted to it a relatively slow uniform movement which insures uniform mixture throughout. By the arrangement described I am enabled to maintain the milk moving relatively slowly and at the same time treat it in any desired manner without materially affecting its physical or chemical characteristic thus permitting the milk to be stored for a relatively long time.

38 indicates a supply pipe for the milk leading through one of the walls 2. the inner end of the pipe preferably extending down to a point near the bottom of the vat. The downwardly extending section of the pipe is arranged at one side of the adjacent propeller 33. The flow of the milk to the vat 1 may be cut off by a suitable valve. 39 indicates a discharge pipe for the milk leading from the lowest portion of the vat 1, and preferably extending through one of the walls 2. The discharge through the pipe 39 is controlled by a suitable valve—see Fig. 1.

To those skilled in the art to which my invention relates many modifications and widely differing embodiments of my invention and applications thereof will suggest themselves without departing from the spirit and scope thereof. The description and the disclosures herein are purely illustrative and are not intended to be in any sense limiting.

What I claim is:

1. In apparatus of the class described, the combination with a vat for holding a body of liquid, of spaced series of pipes through which a temperature changing medium flows, arranged to be immersed in the body of liquid, connections with each said series of pipes for supplying the medium thereto and conveying it therefrom, and means at one end of the vat and immersed in the body of liquid, for causing a flow of the liquid between said series of pipes toward the opposite end thereof.

2. In apparatus of the class described, the combination with a vat for holding a body of liquid, of spaced series of pipes through which a temperature changing medium flows, arranged to be immersed in the body of liquid, connections with each said series of pipes for supplying the medium thereto and conveying it therefrom, and means at each end of the vat and immersed in the body of liquid, for causing a flow of the liquid between said series of pipes toward the opposite end thereof.

3. In apparatus of the class described, the combination with a vat for holding a body of liquid, of spaced series of pipes through which a temperature changing medium flows, arranged to be immersed in the body of liquid, connections with each said series of pipes for supplying the medium thereto and conveying it therefrom, and a rotating propeller at one end of the vat and immersed in the body of liquid, for causing a flow of the liquid between said series of pipes toward the opposite end thereof.

4. In apparatus of the class described, the combination with a vat for holding a body of liquid, of spaced series of pipes through which a temperature changing medium flows, arranged to be immersed in the body of liquid, connections with each said series of pipes for supplying the medium thereto and conveying it therefrom, and a rotating propeller at each end of the vat and immersed in the body of liquid for causing a flow of the liquid between said series of pipes toward the opposite end thereof.

5. In apparatus of the class described, the combination with a vat for holding a body of liquid, of series of pipes immersed in the body of liquid, each connected at their opposite ends to form a conduit for the circulation of a temperature changing medium, each said series of pipes having an inlet and an outlet, and each said series of pipes being disposed substantially midway between the center of said vat and the adjacent side thereof, supply and discharge connections leading to a point outside said vat and connected to said inlet and outlet, respectively, and means at one end of said vat and immersed in the body of liquid for causing a flow of the liquid between said series of pipes toward the opposite end thereof.

6. In apparatus of the class described, the combination with a vat for holding a body of liquid, of series of pipes arranged to be immersed in the body of liquid and each connected at their opposite ends to form a conduit for the circulation of a temperature changing medium, each said series of pipes having an inlet and an outlet, and each said series of pipes being disposed substantially midway between the center of said vat and the adjacent side thereof, supply and discharge connections leading to a point outside said vat and connected to said inlet and outlet, respectively, and means at each end of said vat and immersed in the body of liquid for causing a flow of the liquid between said series of pipes toward the opposite end thereof.

7. In apparatus of the class described, the combination with a vat having side and end walls for holding a body of liquid, of series of pipes immersed in the body of liquid, each series of pipes being connected to form a conduit for the circulation of a temperature changing medium, means for suspending each said series of pipes from certain of said walls clear of the top and bottom of said vat and spaced substantially midway between the center of the vat and the adjacent wall, said means including supply and discharge connections for the medium with each said series of pipes, and means immersed in the body of liquid for causing a flow of the liquid between said series of pipes and from one end thereof toward their opposite ends.

8. In apparatus of the class described, the combination with a vat for holding a body of liquid, of spaced sets of pipes, the pipes in each set being connected in series to form a conduit through which a temperature changing medium flows, and devices for suspending each said set of pipes from the upper or open end of said vat, one of said devices constituting a pipe for supplying the medium to one end of the conduit and another of said devices constituting a pipe connected to the other end of said conduit for conveying the medium away, that pipe which is connected to the lower end of the conduit formed by the adjacent set of pipes being disposed at an angle to the pipe connected to the upper end of the conduit of said set of pipes.

9. In apparatus of the class described, the combination with a vat for holding a body of liquid, of spaced sets of pipes, manifolds for connecting the opposite ends of each set of pipes to form a continuous conduit the opposite ends of which terminate in one of said manifolds and constitute an inlet and an outlet, means for supporting each said set of pipes in said vat, each said means including pipes connected to said inlet and outlet, the pipe connected to that end of the conduit at the upper end of the adjacent manifold depending vertically from the upper portion of said vat and the pipe connected to the opposite end of the conduit depending from the upper portion of said vat at an angle to the other pipe, and means for causing a flow of the liquid between said sets of pipes from one end thereof toward their opposite ends.

In testimony whereof I have hereunto subscribed my name.

HARVEY H. MILLER.